(12) United States Patent
Hanaki et al.

(10) Patent No.: US 6,514,905 B1
(45) Date of Patent: Feb. 4, 2003

(54) EXHAUST GAS PURIFYING CATALYST AND METHOD OF PRODUCING SAME

(75) Inventors: Yasunari Hanaki, Kanagawa (JP); Katsuo Suga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 161 days.

(21) Appl. No.: 09/610,110

(22) Filed: Jul. 5, 2000

(30) Foreign Application Priority Data

Jul. 9, 1999 (JP) ............................................ 11-196254

(51) Int. Cl.$^7$ ............................ B01J 23/58; B01J 23/40; B01J 23/42; B01J 23/56; B01J 23/44
(52) U.S. Cl. ..................... 502/328; 502/327; 502/330; 502/332; 502/333; 502/334; 502/339; 502/527.12
(58) Field of Search ................................. 502/325, 327, 502/328, 330, 332, 333, 334, 339, 527.12; 423/213.5, 239.1

(56) References Cited

U.S. PATENT DOCUMENTS

| | | | | |
|---|---|---|---|---|
| 4,076,792 A | * | 2/1978 | Foster et al. .............. | 423/213.5 |
| 4,152,301 A | * | 5/1979 | Summers et al. ....... | 252/466 PT |
| 4,261,862 A | * | 4/1981 | Kinoshita et al. ............ | 252/462 |
| 4,274,981 A | * | 6/1981 | Suzuki et al. ................ | 252/438 |
| 4,283,308 A | * | 8/1981 | Ohara et al. ................. | 252/435 |
| 4,480,050 A | * | 10/1984 | Brennan ..................... | 502/330 |
| 4,497,783 A |   | 2/1985 | Barber ..................... | 423/213.5 |
| 4,522,792 A | * | 6/1985 | Brennan .................. | 423/213.5 |
| 4,587,231 A | * | 5/1986 | Sawamura et al. .......... | 502/304 |
| 4,654,319 A | * | 3/1987 | Kim et al. .................... | 502/304 |
| 4,919,902 A | * | 4/1990 | Bricker et al. ............ | 423/213.5 |
| 5,019,546 A | * | 5/1991 | Murakami et al. .......... | 502/303 |
| 5,063,192 A | * | 11/1991 | Murakami et al. .......... | 502/303 |
| 5,130,109 A | * | 7/1992 | Wan .......................... | 423/213.2 |
| 5,212,142 A | * | 5/1993 | Dettling ..................... | 502/304 |
| 5,232,889 A | * | 8/1993 | Blanchard et al. .......... | 502/263 |
| 5,254,519 A | * | 10/1993 | Wan et al. .................. | 502/252 |
| 5,352,646 A | * | 10/1994 | Blanchard et al. .......... | 502/263 |
| 5,490,977 A | * | 2/1996 | Wan et al. .................. | 423/210 |
| 5,756,057 A |   | 5/1998 | Tsuchitani et al. ........ | 423/213.2 |
| 5,795,840 A |   | 8/1998 | Takami et al. .............. | 502/327 |
| 6,087,298 A | * | 7/2000 | Sung et al. ................. | 502/333 |
| 6,294,140 B1 | * | 9/2001 | Mussmann et al. ....... | 423/213.5 |
| 6,348,430 B1 | * | 2/2002 | Lindner et al. ............. | 502/304 |

FOREIGN PATENT DOCUMENTS

| | | | | |
|---|---|---|---|---|
| EP | 0 142 859 A | * | 5/1985 |
| EP | 0 272 136 A | * | 6/1988 |
| EP | 0 310 398 A | * | 4/1989 |
| EP | 0 337 809 A | * | 10/1989 |
| EP | 0 443765 A | * | 8/1991 |
| EP | 0 692 302 |   | 1/1996 |
| EP | 0 813 899 A | * | 12/1997 |
| EP | 0 931 590 |   | 7/1999 |
| JP | 5-168860 |   | 7/1993 |

* cited by examiner

*Primary Examiner*—Stanley S. Silverman
*Assistant Examiner*—Cam N. Nguyen
(74) *Attorney, Agent, or Firm*—Foley & Lardner

(57) ABSTRACT

An exhaust gas purifying catalyst for exhaust gas discharged from a lean-burn engine of an automotive vehicle. The catalyst comprises a refractory inorganic carrier. A catalytic layer is coated on the refractory inorganic carrier. The exhaust gas purifying catalyst layer contains platinum and at least one noble metal selected from the group consisting of palladium and rhodium, and a NOx trapping substance. In the catalytic layer, platinum exists close enough to the NOx trapping substance to accept $NO_2$ from the NOx trapping substance which $NO_2$ is produced according to reaction expressed by the following chemical equation: $M(NO_3)_2 \rightarrow 2NO_2 + 3/2 O_2 + MO$ where M is the NOx trapping substance.

15 Claims, 1 Drawing Sheet

EXHAUST GAS PURIFYING CATALYST AND METHOD OF PRODUCING SAME

BACKGROUND OF THE INVENTION

This invention relates to improvements in an exhaust gas purifying catalyst for promoting oxidation and reduction of hydrocarbons (HC), carbon monoxide (CO) and nitrogen oxides (NOx) in exhaust gas discharged from an internal combustion engine such as a gasoline-fueled or a diesel engine and a combustion device such as a boiler, and more particularly to an exhaust gas purifying catalyst which includes a refractory inorganic carrier coated with a catalytic layer containing noble metals and a NOx trapping substance, and to a method of producing the exhaust gas purifying catalyst, the catalyst being suitably used for reduction of NOx in an oxygen-excess exhaust gas atmosphere.

In recent years, automotive vehicles having good fuel economy have been increasing in view of problems of petroleum resources exhaustion and earth temperature increase. Concerning gasoline-fueled engines used for automotive vehicles, attention has been paid on development of lean-burn engines which are operated mainly on lean air-fuel mixtures. In such lean-burn engines, exhaust gas atmosphere becomes lean (in fuel) to have air-fuel ratio leaner than stoichiometric level during a vehicle cruising in which the engine is operated on lean air-fuel mixtures (i.e., in a lean operating region). It has been known that a NOx reduction effect becomes insufficient under the action of excessive oxygen when a conventional three-way catalyst is used in the lean operating region.

In view of the above, a variety of catalysts have been proposed. One of them is disclosed in Japanese Patent Provisional Publication No. 5-168860, in which platinum (Pt) and lanthanum. (La) are carried on porous carrier so that NOx is trapped in the lean operating region and release NOx in a stoichiometric operating region where the engine is operated on generally stoichiometric air-fuel mixture.

SUMMARY OF THE INVENTION

However, even the above catalyst disclosed in Japanese Patent Provisional Publication No. 5-168860 cannot exhibit a sufficient NOx reduction performance, taking a present strict emission standard into consideration.

In order to solve the above problems, researches and developments have been made by the inventors. As a result, the present invention has been completed by controlling locational relationship between platinum and a NOx trapping substance in a catalytic layer formed on a refractory inorganic carrier.

Therefore, an object of the present invention is to provide an improved exhaust gas purifying catalyst and a method of producing the same catalyst, which can effectively overcome drawbacks encountered in conventional similar exhaust gas purifying catalysts can be effectively solved.

Another object of the present invention is to provide an improved exhaust gas purifying catalyst which is excellent in NOx reduction performance and in durability, and an improved method of producing the same catalyst.

A further object of the present invention is to provide an improved exhaust gas purifying catalyst which is high in NOx trapping characteristics in the lean (oxygen-excess) exhaust gas atmosphere and effectively promoting reaction of released NOx and reducing agents such as HC and CO, and a method of producing the same catalyst.

An aspect of the present invention resides in an exhaust gas purifying catalyst which comprises a refractory inorganic carrier. A catalytic layer is coated on the refractory inorganic carrier. The exhaust gas purifying catalyst layer contains platinum and at least one noble metal selected from the group consisting of palladium and rhodium, and a NOx trapping substance. In the catalytic layer, platinum exists close enough to the NOx trapping substance to accept $NO_2$ from the NOx trapping substance which $NO_2$ is produced according to reaction expressed by the following chemical equation: $M(NO_3)_2 \rightarrow 2NO_2 + 3/2O_2 + MO$ where M is the NOx trapping substance.

Another aspect of the present invention resides in an exhaust gas purifying system in combination with a lean-burn engine operated mainly on air-fuel mixture whose air-fuel ratio is leaner than a stoichiometric level, the exhaust gas purifying system comprising. The exhaust gas purifying catalyst includes a refractory inorganic carrier, and a catalytic layer coated on the refractory inorganic carrier. The catalytic layer contains platinum and at least one noble metal selected from the group consisting of palladium and rhodium, and a NOx trapping substance. In the catalytic layer, platinum exists close enough to the NOx trapping substance to accept $NO_2$ from the NOx trapping substance which $NO_2$ is produced according to a reaction expressed by the following chemical equation: $M(NO_3)_2 \rightarrow 2NO_2 + 3/2O_2 + MO$ where M is the NOx trapping substance.

A further aspect of the present invention resides in a method of producing an exhaust gas purifying catalyst. The method comprises (a) preparing a refractory inorganic carrier; (b) forming a first layer part on the refractor inorganic carrier, the first layer part containing at least one of platinum and palladium; (c) forming a second layer part on the first coat layer, the second coat layer containing platinum and rhodium and being higher in concentration of platinum than the first coat layer; and (d) impregnating at least one of the first and second coat layers with NOx trapping substance.

DETAILED DESCRIPTION OF THE INVENTION

According to the present invention, an exhaust gas purifying catalyst comprises a refractory inorganic carrier. A catalytic layer is coated on the refractory inorganic carrier. The exhaust gas purifying catalyst layer contains platinum (Pt) and at least one noble metal selected from the group consisting of palladium (Pd) and rhodium (Rh), and a NOx (nitrogen oxides) trapping substance. In the catalytic layer, platinum exists close enough to the NOx trapping substance to accept $NO_2$ from the NOx trapping substance which $NO_2$ is produced according to reaction expressed by the following chemical equation: $M(NO_3)_2 \rightarrow 2NO_2 + 3/2O_2 + MO$ where M is the NOx trapping substance.

The exhaust gas purifying catalyst is produced by coating the catalytic layer on the refractory inorganic carrier. The catalytic layer contains noble metals, and the NOx trapping substance. The noble metals contained in the catalytic layer includes platinum as an essential component, and palladium and/or rhodium. Platinum is high in reactivity with NOx to improve the reactivity of NOx with reducing substances such as HC (hydrocarbons) and CO (carbon monoxide) thereby exhibiting a high NOx reduction performance. Rhodium further improves the NOx reduction performance.

The NOx trapping substance contained in the catalytic layer includes alkali metal(s) and/or alkali earth metal(s). Examples of such metals(s) are magnesium (Mg), calcium (Ca), strontium (Sr), barium (Ba), sodium (Na), potassium (K) and Cs (cesium), and any combination or mixture of the metals. Such a NOx trapping substance can trap or absorb NOx in a lean exhaust gas atmosphere and release the trapped NOx in a stoichiometric and rich exhaust gas atmosphere. The lean exhaust gas atmosphere has an exhaust gas composition in which air-fuel ratio is leaner (in fuel) than a stoichiometric level. The stoichiometric exhaust gas atmosphere has an exhaust gas composition where air-fuel ratio is around the stoichiometric level. The rich exhaust gas atmosphere has an exhaust gas composition where air-fuel ratio is richer (in fuel) than the stoichiometric level. In case of an internal combustion engine, the lean, stoichiometric and rich exhaust gas atmospheres are discharged from the engine in lean, stoichiometric and rich operating regions, respectively. In the lean operating region, the engine is operated by being supplied with air-fuel mixture having an air-fuel ratio leaner than the stoichiometric level. In the stoichiometric air-fuel ratio, the engine is operated by being supplied with air-fuel mixture having an air-fuel ratio around the stoichiometric level. In the rich operating region, the engine is operated by being supplied with air-fuel mixture having an air-fuel ratio richer than the stoichiometric level.

Thus, the exhaust gas purifying catalyst of the present invention traps NOx contained in exhaust gas in the lean exhaust gas atmosphere or in the lean operating region under the action of the NOx trapping substance, and releases trapped NOx in the rich exhaust gas atmosphere or in the rich operating region. The thus released NOx is reduced under the action of Pt. Additionally, the exhaust gas purifying catalyst can effectively exhibit the function of a three-way catalyst under the action of Pd and/or Rh. Particularly under the action of Rh carried in the catalytic layer, the exhaust gas purifying catalyst can exhibit a high NOx reduction performance in the stoichiometric and rich operating regions.

The refractory inorganic carrier is, for example, a honeycomb type monolithic carrier formed of a refractory material. The monolithic carrier has a plurality of cells which straight extend throughout the length of the carrier. By coating the catalytic layer on the monolithic carrier, a contacting area of the monolithic carrier with exhaust gas is increased while suppressing a pressure loss of the exhaust gas purifying catalyst. Additionally, the catalyst is highly resistant to vibration and friction so as to be advantageous in case of being used as a catalyst for purifying exhaust gas discharged from the internal combustion engine of an automotive vehicle.

The monolithic carrier is preferably formed of cordierite ceramic or the like, and may be formed of a metal such as ferrite stainless steel or the like. Furthermore, powder containing catalytic components such as noble metals is formed into the shape of the honeycomb thereby to form an exhaust gas purifying catalyst.

In order to cause a sufficient catalytic activity to be exhibited, it is preferable that the noble metals and the NOx trapping substance may be carried on porous material or carrier powder such as alumina (powder). The porous material carrying the noble metals and the NOx trapping substance is coated on the monolithic carrier so as to form the catalytic layer. In this case, alumina is preferably activated alumina having a specific surface area ranging from 50 to 300 $m^2/g$.

The catalytic layer may contain, for example, rare earth element(s) such as cerium (Ce), lanthanum (La) and/or the like to improve a heat resistance of activated alumina, and ceria ($CeO_2$) having an oxygen storage function to enhance the function of the three-way catalyst. The catalytic layer may contain zirconia (ZrO2) and/or the like to improve catalytic performance of Rh at high temperatures.

The content of the noble metals and the NOx trap material in the catalyst is not particularly limited; however, it is preferable that the content of the noble metals such as Pt is within a range of from 1.5 to 20 g per 1 liter of the monolithic carrier. If the content of the noble metals is less than 1.5 g, a sufficient NOx reduction performance may not be obtained. Even if the content of the noble metals exceeds 20 g, a corresponding effect may not be obtained. The content of noble metals is more preferably within a range of from 2.8 to 8.5 g per 1 liter of the monolithic carrier. In case that Rh is contained in the catalytic layer, it is preferable that the content of Rh is within a range of from 0.1 to 2.0 g per 1 liter of the monolithic carrier.

The content of the NOx trap material (in the state of oxide) is within a range of from 10 to 70 g per 1 liter of the monolithic carrier. If the content of the NOx trapping substance is less than 10 g, a sufficient NOx trap performance may be obtained. Even if the content of the NOx trapping substance exceeds 70 g, a NOx trapping effect may be saturated.

Next, locational relationship between Pt and the NOx trapping substance in the catalytic layer will be discussed.

In the catalytic layer of the exhaust gas purifying catalyst of the present invention, Pt exists sufficiently close to the NOx trapping substance to readily accept NOx ($NO_2$) from the NOx trapping substance, $NO_2$ being produced according to reaction expressed by the following chemical equation: $M(NO_3)_2 \rightarrow 2NO_2 + 3/2O_2 + MO$ where M is the NOx trapping substance. If Pt exists too far from the NOx trapping substance, Pt cannot accept $NO_2$ from the NOx trapping substance, thereby rendering it difficult to accomplish a reduction treatment of $NO_2$.

Additionally, it is preferable that the concentration of Pt in the catalytic layer increases as a position becomes close to the surface of the catalytic layer. This increases a frequency of contact of Pt with NOx in exhaust gas and $NO_2$ released from the NOx trapping substance, thereby realizing a further improved NOx reduction performance of the exhaust gas purifying catalyst.

Furthermore, it is preferable that Pt in an amount of 10 to 100% by weight of total Pt in the catalytic layer is contained in a surface layer part of the catalytic layer which surface layer portion extends from the surface of the catalytic layer to a depth of 0.1 mm from the surface of the catalytic layer. NOx can be effectively reduced if a large amount of Pt is contained in this surface layer portion, because exhaust gas (particularly NOx) can flow through the surface layer portion. In case that the whole surface of the catalytic layer is covered with Pt, exhaust gas is difficult to flow into the catalytic layer thereby making it difficult to cause NOx to be trapped to the NOx trapping substance, so that the above-mentioned sufficient NOx reduction performance may not be obtained. Thus, it is preferable that a part of or whole of the NOx trapping substance (for example, alkali metal(s) and/or alkaline earth metal(s)) is contained in the surface layer portion.

The catalytic layer preferably consists of upper and lower layer parts (two layer parts), in which Pt and Rh are contained in the upper layer part while Pt and Pd are contained in the lower layer part. It is preferable that Pt is contained in both the upper and lower layer parts in order to enhance acceptance of NOx from the NOx trapping substance. Additionally, it is also preferable that Rh is contained in the upper layer part to effectively exhibit its reduction activity while Pd is contained in the lower layer part to prevent the activity of Pt in the upper layer part from being suppressed. In such a case where the catalytic layer consists of the two layer parts, the amount of Pt contained in the upper layer part is preferably within a range of from 30 to 80% by weight of total Pt contained or carried in the catalytic layer. If the amount of Pt is less than 30% by weight, a sufficient NOx reduction performance may not be obtained. Even if the amount of Pt exceeds 80% by weight, a corresponding improvement effect for NOx reduction may not be obtained.

As discussed above, the exhaust gas purifying catalyst of the present invention includes the catalytic layer which contains the noble metals such as Pt and the like, the NOx trapping substance such as the alkaline earth metal. Additionally, the catalytic layer optionally contains alumina and other additives. It is preferable that such substances or materials (in powder state) contained in the catalytic layer are regulated to have an average particle size (diameter) not larger than 4 μm. With such an average particle size, the surface area of the catalytic layer increases thereby increasing the contacting frequency of catalyst components (such as the noble metals) with exhaust gas. This lowers the flow speed of exhaust gas in the catalytic layer so as to provide a sufficient reaction time, thus causing NOx trapping action and NOx reduction to be sufficiently exhibited.

The exhaust gas purifying catalyst of the present invention is suitable for exhaust gas purification of exhaust gas discharged from a so-called lean-burn engine which is arranged to be operated mainly on lean air-fuel mixture having an air-fuel ratio leaner than the stoichiometric level. The lean-burn engine is supplied with air-fuel mixture whose air-fuel ratio (air/fuel) is repeatedly changed within a range of from 10 to 50. The exhaust gas purifying catalyst incorporated with the lean-burn engine traps NOx in the lean operating region and reduces NOx in the rich and stoichiometric operating regions. The exhaust gas purifying catalyst can exhibit a better NOx reduction performance in case that the air-fuel ratio in the lean operating region is within a range of from 10 to 14.8 and that the air-fuel ratio in the rich operating region is within a range of from 15 to 50.

Next, method of producing the exhaust gas purifying catalyst of the present invention will be discussed.

The method comprises (a) preparing a refractory inorganic carrier; (b) forming a first coat layer (lower layer part) on the refractor inorganic carrier, the first layer part containing at least one of platinum and palladium; (c) forming a second coat layer (upper layer part) on the first coat layer, the second coat layer containing platinum and rhodium and being higher in concentration of platinum than the first coat layer; and (d) impregnating at least one of the first and second coat layers with NOx trapping substance. In this method, the forming the first coat layer is accomplished by impregnating carrier powder with the at least one of platinum and palladium, and the forming the second coat layer is accomplished by impregnating carrier powder with the platinum and rhodium. Preferably, the carrier powder impregnated with the noble metals are coated on the monolithic carrier and fired upon drying, before impregnation of the first and/or second coat layers with the NOx trapping substance. After impregnation of the first/or second coat layers with the NOx trapping substance, the impregnated first and/or second coat layers are dried and fired.

According to the above impregnation (process), the NOx trapping substance and the noble metals can be carried in a highly dispersed state, thereby improving a NOx trapping performance and a NOx reduction performance of the exhaust gas purifying catalyst. The impregnation of the NOx trapping substance such as Mg, Sr, Ba, Na, K and Cs is preferably accomplished by using an aqueous solution of a salt of the NOx trapping substance (metal). The above impregnation (process) may be replaced with a precipitation process, a gelling process, or an ion exchange process as far as the obtained exhaust gas purifying catalyst exhibits a desired performance.

Figure 1:
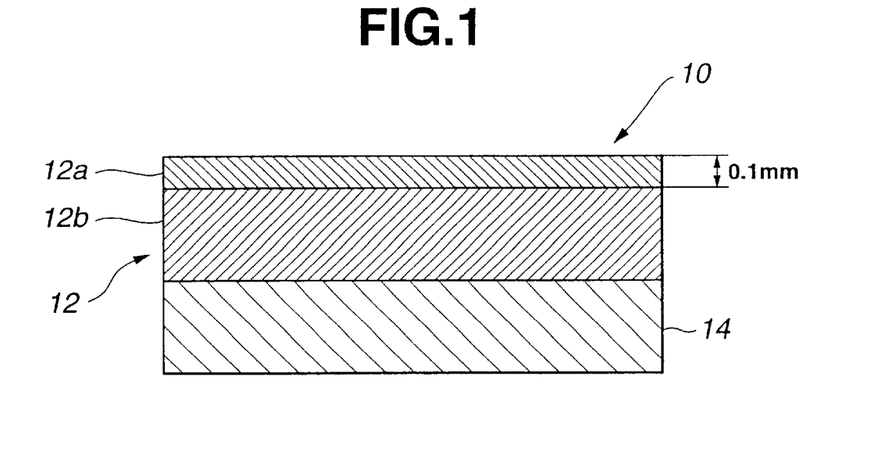
FIG. 1 is a fragmentary enlarged sectional illustration of an example of an exhaust gas purifying catalyst according to the present invention.

FIG. 1 shows a part of an example of the exhaust gas purifying catalyst 10 according to the present invention. The catalyst 10 comprises the refractory inorganic (cordierite ceramic honeycomb-type monolithic) carrier 14. The catalytic layer 12 is coated on the refractory inorganic carrier 14 and includes the upper and lower layer parts 12a, 12b. The upper layer part 12a contains platinum and rhodium. The lower layer part 12b contains platinum and/or palladium. The concentration of platinum is higher in the upper layer part 12a than in the lower layer part 12b. Platinum in an amount ranging from 10 to 100% by weight of total amount of platinum in the catalytic layer 12 is contained in the surface layer portion which lies between the surface of the catalytic layer 12 and a depth of 0.1 mm from the surface of the catalytic layer 12. In this example, the surface layer portion corresponds to the upper layer part 12a having a thickness of 0.1 mm. An amount ranging from 30 to 80% by weight of total amount of platinum in the catalytic layer 12 is contained in the upper layer part 12a of the catalytic layer 12. The upper and lower layer parts 12a, 12b contain carrier power such as activated alumina powder (γ-alumina), in which the carrier powder is impregnated with the noble metals such as platinum are carried. Both the upper and lower layer parts 12a, 12b of the catalytic layer 12 also contain the NOx trapping substance, in which whole or a part of the NOx trapping substance contained in the catalytic layer 12 is located exposed to the surface of the catalytic layer 12. The NOx trapping substance is also carried on the carrier powder.

Figure 2:
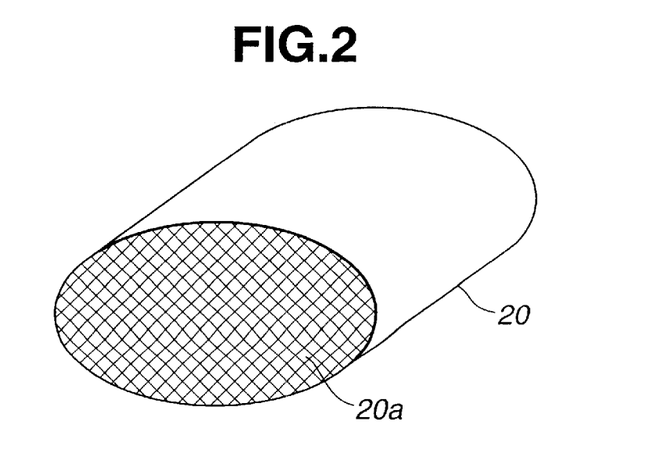
FIG. 2 is a perspective view of an embodiment of an exhaust gas purifying catalyst according to the present invention in which a cordierite ceramic honeycomb-type monolithic carrier is used.

FIG. 2 shows an embodiment of an exhaust gas purifying catalyst 20 according to the present invention in which a cordierite ceramic honeycomb-type monolithic carrier is used. The monolithic carrier has many cells which extend throughout the length thereof Each cell is defined by four flat walls (14). In the catalyst 20, the walls defining each cell is covered with the above-mentioned catalytic layer 12. The covered walls of each cell defines a gas passage extending throughout the length of the monolithic carrier. It will be understood that exhaust gas from the engine flows through each gas passage and is brought into contact with the noble metals and the NOx trapping substance.

Figure 3:
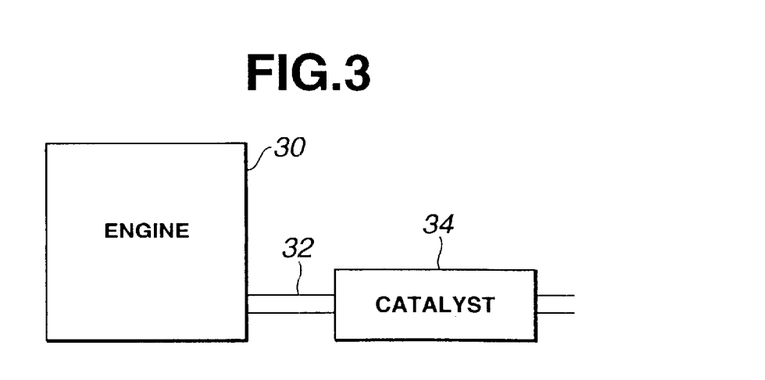
FIG. 3 is a schematic illustration of an internal combustion engine equipped with an exhaust gas purifying catalyst according to the present invention.

FIG. 3 shows the exhaust gas purifying catalyst 34(20) disposed in the exhaust gas passageway 32 forming part of an exhaust system of an internal combustion engine (the lean-burn engine) 30 which is operated mainly on the lean mixture. The exhaust gas purifying catalyst 34 is disposed in the form of a catalytic converter, in the exhaust gas passageway 32. The catalytic converter includes a casing (not shown) in which the catalyst 20 in. FIG. 2 is disposed.

EXAMPLES

The present invention will be more readily understood with reference to the following Examples in comparison with Comparative Examples; however, these Examples are intended to illustrate the invention and are not to be construed to limit the scope of the invention.

Example 1

Activated alumina (γ-alumina) powder was impregnated with an aqueous soulution of platinum (Pt) nitrate. The impregnated activated alumina was dried and then fired in air at 400° C. for 1 hour thereby to form activated alumina powder carrying Pt (Powder 1). This powder had a Pt concentration of 8% by weight.

Further, activated alumina powder (γ-alumina) was impregnated with an aqueous solution of dinitrodiammine palladium (Pd). The impregnated activated alumina was dried and then fired in air at 400° C. for 1 hour thereby to form activated alumina powder carrying Rd (Powder 2). This powder had a Rd concentration of 8% by weight.

Furthermore, activated alumina powder (γ-alumina) was impregnated with an aqueous solution of rhodium (Rh) nitrate. The impregnated activated alumina powder was dried and then fired in air at 400° C. for 1 hour thereby to form activated alumina powder carrying Rh (Powder 3). This powder had a Pt concentration of 2% by weight.

Subsequently, a porcelain ball mill was charged with 50 g of Powder 2, 200 g of alumina and 250 g of water. The content of the ball mill was mixed and pulverized thereby to form a slurry in which fine powder (materials in powder state) was dispersed. The fine powder in the slurry had an average particle size of 3.2 μm. This slurry was coated on a cordierite ceramic honeycomb-type monolithic carrier having a volume of 1.3 liters and 400 cells per square inch. The cells were formed extending throughout the length of the monolithic carrier. Then, the coated monolithic carrier was blown with air to remove excessive slurry in the cells under the influence of air stream. Thereafter, the coated monolithic carrier was dried at 130° C. and then fired at 400° C. for 1 hour thereby to form a coated monolithic carrier (A1) provided with a coat layer having a weight of 125 g per 1 liter of the monolithic carrier.

A porcelain ball mill was charged with 100 g of Powder 1, 50 g of Powder 2, 50 g of Powder 3, 50g of alumina and 250 g of water. The content of the ball mill was mixed and pulverized thereby to form a slurry in which fine powder (materials in powder state) was dispersed. The fine powder in the slurry had an average particle size of 3.2 μm. This slurry was coated on the coated monolithic carrier (A1) with the coat layer. Then, the coated monolithic carrier (A1) was blown with air to remove excessive slurry in the cells under the influence of air stream. Thereafter, the coated monolithic carrier was dried at 130° C. and then fired at 400° C. for 1 hour thereby to form a coated monolithic carrier (B1) provided with coat layers having a total weight of 250 g per 1 liter of the monolithic carrier.

Thereafter, the coated monolithic carrier (B1) was impregnated with an aqueous solution of barium acetate and fired at 400° C. for 1 hour after drying at 130° C. so as to carry 30 g of Ba (in oxide state) per 1 liter of the monolithic carrier. As a result, an exhaust gas purifying catalyst (C1) of Example 1 was produced.

Example 2

A coated monolithic carrier (A2) was prepared in the same manner as that (A1) in Example 1 with the exception that 50 g of Powder 1, 200 g of alumina and 250 g of water were used. The coated monolithic carrier (A2) was provided with a coat layer having a weight of 125 g per 1 liter of the monolithic carrier.

Subsequently, a coated monolithic carrier (B2) was prepared in the same manner as that (B1) in Example 1 with the exception that 50 g of Powder 1, 100 g of Powder 2, 50 g of Powder 3, 50 g of alumina and 250 g of water were used. The coated monolithic carrier (B2) was provided with coat layers having a total weight of 250 g per 1 liter of the monolithic carrier.

The coated monolithic carrier (B2) was subjected to the same procedure as that (B1) in Example 1. As a result, an exhaust gas purifying catalyst (C2) of Example 2 was produced.

Example 3

A coated monolithic carrier (A3) was prepared in the same manner as that (A1) in Example 1 with the exception that 50g of Powder 1, 50 g of Powder 2, 150 g of alumina and 250 g of water were used. The coated monolithic carrier (A3) was provided with a coat layer having a weight of 125 g per 1 liter of the monolithic carrier.

Subsequently, a coated monolithic carrier (B3) was prepared in the same manner as that (B1) in Example 1 with the exception that 50 g of Powder 1, 50 g of Powder 2, 50 g of Powder 3, 100 g of alumina and 250 g of water were used. The coated monolithic carrier (B3) was provided with coat layers having a total weight of 250 g per 1 liter of the monolithic carrier.

The coated monolithic carrier (B2) was subjected to the same procedure as that (B1) in Example 1. As a result, an exhaust gas purifying catalyst (C3) of Example 3 was produced.

Example 4

A coated monolithic carrier (A4) was prepared in the same manner as that (A1) in Example 1 with the exception that 90 g of Powder 1, 50 g of Powder 2, 110 g of alumina and 250 g of water were used. The coated monolithic carrier (A4) was provided with a coat layer having a weight of 125 g per 1 liter of the monolithic carrier.

Subsequently, a coated monolithic carrier (B4) was prepared in the same manner as that (B1) in Example 1 with the exception that 10 g of Powder 1, 50 g of Powder 2, 50 g of Powder 3, 140 g of alumina and 250 g of water were used. The coated monolithic carrier (B4) was provided with coat layers having a total. weight of 250 g per 1 liter of the monolithic carrier.

The coated monolithic carrier (B4) was subjected to the same procedure as that (B1) in Example 1. As a result, an exhaust gas purifying catalyst (C4) of Example 4 was produced.

Example 5

A coated monolithic carrier (A5) was prepared in the same manner as that (A1) in Example 1 with the exception that 75 g of Powder 1, 75 g of Powder 2, 100 g of alumina and 250 g of water were used. The coated monolithic carrier (A5) was provided with a coat layer having a weight of 125 g per 1 liter of the monolithic carrier.

Subsequently, a coated monolithic carrier (B5) was prepared in the same manner as that (B1) in Example 1 with the exception that 27.5 g of Powder 1, 27.5 g of Powder 2, 50 g of Powder 3, 147.5 g of alumina and 250 g of water were used. The coated monolithic carrier (B5) was provided with coat layers having a total weight of 250 g per 1 liter of the monolithic carrier.

The coated monolithic carrier (B5) was subjected to the same procedure as that (B1) in Example 1. As a result, an exhaust gas purifying catalyst (C5) of Example 5 was produced.

Example 6

A coated monolithic carrier (A6) was prepared in the same manner as that (A1) in Example 1 with the exception that 62.5 g of Powder 1, 62.5 g of Powder 2, 125 g of alumina and 250 g of water were used. The coated monolithic carrier (A6) was provided with a coat layer having a weight of 125 g per 1 liter of the monolithic carrier.

Subsequently, a coated monolithic carrier (B6) was prepared in the same manner as that (B1) in Example 1 with the exception that 37.5 g of Powder 1, 37.5 g of Powder 2, 50 g of Powder 3, 125 g of alumina and 250 g of water were used. The coated monolithic carrier (B6) was provided with coat layers having a total weight of 250 g per 1 liter of the monolithic carrier.

The coated monolithic carrier (B6) was subjected to the same procedure as that (B1) in Example 1. As a result, an exhaust gas purifying catalyst (C6) of Example 6 was produced.

Example 7

A porcelain ball mill was charged with 100 g of alumina and 200 g of water. The content of the ball mill was mixed and pulverized thereby to form a slurry in which fine powder (materials in powder state) was dispersed. The fine powder in the slurry had an average particle size of 3.2 μm. This slurry was coated on a cordierite ceramic honeycomb-type monolithic carrier having a volume of 1.3 liters and 400 cells per square inch. The cells were formed extending throughout the length of the monolithic carrier. Then, the coated monolithic carrier was blown with air to remove excessive slurry in the cells under the influence of air stream. Thereafter, the coated monolithic carrier was dried at 130° C. and then fired at 400° C. for 1 hour thereby to form a coated monolithic carrier (A7) provided with a coat layer having a weight of 55 g per 1 liter of the monolithic carrier.

Subsequently, a porcelain ball mill was charged with 50 g of Powder 2, 90 g of alumina and 140 g of water. The content of the ball mill was mixed and pulverized thereby to form a slurry in which fine powder (materials in powder state) was dispersed. The fine powder in the slurry had an average particle size of 3.2 μm. This slurry was coated on the coated monolithic carrier (A7) with the coat layer. Then, the coated monolithic carrier (A7) was blown with air to remove excessive slurry in the cells under the influence of air stream. Thereafter, the coated monolithic carrier was dried at 130° C. and then fired at 400° C. for 1 hour thereby to form a coated monolithic carrier (B7) provided with coat layers having a total weight of 125 g per 1 liter of the monolithic carrier.

Then, a porcelain ball mill was charged with 100 g of Powder 1, 50 g of Powder 2, 50 g of Powder 3, 50 g of alumina and 250 g of water. The content of the ball mill was mixed and pulverized thereby to form a slurry in which fine powder (materials in powder state) was dispersed. The fine powder in the slurry had an average particle size of 3.2 μm. This slurry was coated on the coated monolithic carrier (B7) with the coat layer. Then, the coated monolithic carrier (B7) was blown with air to remove excessive slurry in the cells under the influence of air stream. Thereafter, the coated monolithic carrier was dried at 130° C. and then fired at 400° C. for 1 hour thereby to form a coated monolithic carrier (C7) provided with coat layers having a total weight of 250 g per 1 liter of the monolithic carrier.

Thereafter, the coated monolithic carrier (C7) was impregnated with an aqueous solution of barium acetate and fired at 400° C. for 1 hour after drying at 130° C. so as to carry 30 g of Ba (in oxide state) per 1 liter of the monolithic carrier. As a result, an exhaust gas purifying catalyst (D7) of Example 7 was produced.

Example 8

Activated alumina (γ-alumina) powder, cerium nitrate and zirconyl nitrate, lanthanum nitrate and water were mixed to form a mixture. The mixture was dried at 150° C. for 3 hours and then fired at 400° C. for 1 hour thereby forming an alumina powder carrying Ce, Zr and La, in which the weight % of Ce (in the oxide state), Zr and La were respectively 2, 7 and 7.

Then, the Ce-Zr-La carrying activated alumina power was impregnated with an aqueous solution of palladium (Pd) nitrate was dried and then fired in air at 400° C. for 1 hour thereby to form activated alumina powder carrying Pd (Powder 10). This powder had a Pd concentration of 4% by weight.

Further, the Ce-Zr-La carrying activated alumina powder was impregnated with an aqueous solution of dinitrodiammine platinum (Pt). The impregnated activated alumina was dried and then fired in air at 400° C. for 1 hour thereby to form activated alumina powder carrying Pt (Powder 11). This powder had a Pt concentration of 4% by weight.

Furthermore, activated alumina powder (γ-alumina) was impregnated with an aqueous solution of rhodium (Rh) nitrate. The impregnated activated alumina powder was dried and then fired in air at 400° C. for 1 hour thereby to form activated alumina powder carrying Rh (Powder 12). This powder had a Rh concentration of 4% by weight.

Subsequently, a porcelain ball mill was charged with 70 g of Powder 11, 30 g of Powder 10, 100 g of alumina and 200 g of water. The content of the ball mill was mixed and pulverized thereby to form a slurry in which fine powder (materials in powder state) was dispersed. The fine powder in the slurry had an average particle size of 3.2 μm. This slurry was coated on a cordierite ceramic honeycomb-type monolithic carrier having a volume of 1.3 liters and 400 cells per square inch. The cells were formed extending throughout the length of the monolithic carrier. Then, the coated monolithic carrier was blown with air to remove excessive slurry in the cells under the influence of air stream. Thereafter, the coated monolithic carrier was dried at 130° C. and then fired at 400° C. for 1 hour thereby to form a coated monolithic carrier (A8) provided with a coat layer having a weight of 200 g per 1 liter of the monolithic carrier.

A porcelain ball mill was charged with 11 g of Powder 11, 30 g of Powder 10, 10 g of Powder 12 and 110 g of water. The content of the ball mill was mixed and pulverized thereby to form a slurry in which fine powder (materials in powder state) was dispersed. The fine powder in the slurry had an average particle size of 3.2 μm. This slurry was coated on the coated monolithic carrier (A8) with the coat layer. Then, the coated monolithic carrier (A8) was blown with air to remove excessive slurry in the cells under the influence of air stream. Thereafter, the coated monolithic carrier was dried at 130° C. and then fired at 400° C. for 1 hour thereby to form a coated monolithic carrier (B8) provided with coat layers having a total weight of 310 g per 1 liter of the monolithic carrier.

Thereafter, the coated monolithic carrier (B8) was impregnated with an aqueous solution of cesium (Cs) carbonate and fired at 400° C. for 1 hour after drying at 130° C. so as to carry 30 g of Cs (in oxide state) per 1 liter of the monolithic carrier. As a result, an exhaust gas purifying catalyst (C8) of Example 8 was produced.

Example 9

Activated alumina (γ-alumina) powder was impregnated with an aqueous solution of palladium (Pd) nitrate was dried and then fired in air at 400° C. for 1 hour thereby to form activated alumina powder carrying Pd (Powder 13). This powder had a Pd concentration of 4% by weight.

Further, activated alumina powder (γ-alumina) was impregnated with an aqueous solution of dinitrodiammine platinum (Pt). The impregnated activated alumina was dried and then fired in air at 400° C. for 1 hour thereby to form activated alumina powder carrying Pt (Powder 14). This powder had a Pt concentration of 4% by weight.

Furthermore, activated alumina powder (γ-alumina) was impregnated with an aqueous solution of rhodium (Rh) nitrate. The impregnated activated alumina powder was dried and then fired in air at 400° C. for 1 hour thereby to form activated alumina powder carrying Rh (Powder 15). This powder had a Rh concentration of 4% by weight.

Subsequently, a porcelain ball mill was charged with 70 g of Powder 14, 30 g of Powder 13, 100 g of alumina and 200 g of water. The content of the ball mill was mixed and pulverized thereby to form a slurry in which fine powder (materials in powder state) was dispersed. The fine powder in the slurry had an average particle size of 3.2 μm. This slurry was coated on a cordierite ceramic honeycomb-type monolithic carrier having a volume of 1.3 liters and 400 cells per square inch. The cells were formed extending throughout the length of the monolithic carrier. Then, the coated monolithic carrier was blown with air to remove excessive slurry in the cells under the influence of air stream. Thereafter, the coated monolithic carrier was dried at 130° C. and then fired at 400° C. for 1 hour thereby to form a coated monolithic carrier (A9) provided with a coat layer having a weight of 200 g per 1 liter of the monolithic carrier.

A porcelain ball mill was charged with 70 g of Powder 14, 30 g of Powder 13, 10 g of Powder 15 and 110 g of water. The content of the ball mill was mixed and pulverized thereby to form a slurry in which fine powder (materials in powder state) was dispersed. The fine powder in the slurry had an average particle size of 3.2 μm. This slurry was coated on the coated monolithic carrier (A9) with the coat layer. Then, the coated monolithic carrier (A9) was blown with air to remove excessive slurry in the cells under the influence of air stream. Thereafter, the coated monolithic carrier was dried at 130° C. and then fired at 400° C. for 1 hour thereby to form a coated monolithic carrier (B9) provided with coat layers having a total weight of 310 g per 1 liter of the monolithic carrier.

Thereafter, the coated monolithic carrier (B9) was impregnated with an aqueous solution of cesium (Cs) carbonate and fired at 400° C. for 1 hour after drying at 130° C. so as to carry 30 g of Cs (in oxide state) per 1 liter of the monolithic carrier. As a result, an exhaust gas purifying catalyst (C9) of Example 9 was produced.

Example 10

Activated alumina (γ-alumina) powder, cerium nitrate and zirconyl nitrate, lanthanum nitrate and water were mixed to form a mixture. The mixture was dried at 150° C. for 3 hours and then fired at 400° C. for 1 hour thereby forming an alumina powder carrying Ce, Zr and La, in which the weight % of Ce (in oxide state), Zr and La were respectively 2, 7 and 7.

Then, the Ce-Zr-La carrying activated alumina powder was impregnated with an aqueous solution of dinitrodiammine platinum (Pt). The impregnated activated alumina was dried and then fired in air at 400° C. for 1 hour thereby to form activated alumina powder carrying Pt (Powder 16). This powder had a Pt concentration of 4% by weight.

Furthermore, activated alumina powder (γ-alumina) was impregnated with an aqueous solution of rhodium (Rh) nitrate. The impregnated activated alumina powder was dried and then fired in air at 400° C. for 1 hour thereby to form activated alumina powder carrying Rh (Powder 17). This powder had a Rh concentration of 4% by weight.

Subsequently, a porcelain ball mill was charged with 97.5 g of Powder 16, 102.5 g of alumina and 200 g of water. The content of the ball mill was mixed and pulverized thereby to form a slurry in which fine powder (materials in powder state) was dispersed. The fine powder in the slurry had an average particle size of 3.2 μm. This slurry was coated on a cordierite ceramic honeycomb-type monolithic carrier having a volume of 1.3 liters and 400 cells per square inch. The cells were formed extending throughout the length of the monolithic carrier. Then, the coated monolithic carrier was blown with air to remove excessive slurry in the cells under the influence of air stream. Thereafter, the coated monolithic carrier was dried at 130° C. and then fired at 400° C. for 1 hour thereby to form a coated monolithic carrier (A10) provided with a coat layer having a weight of 200 g per 1 liter of the monolithic carrier.

A porcelain ball mill was charged with 97.5 g of Powder 16, 17.5 g of Powder 17, and 115 g of water. The content of the ball mill was mixed and pulverized thereby to form a slurry in which fine powder (materials in powder state) was dispersed. The fine powder in the slurry had an average particle size of 3.2 μm. This slurry was coated on the coated monolithic carrier (A10) with the coat layer. Then, the coated monolithic carrier (A10) was blown with air to remove excessive slurry in the cells under the influence of air stream, Thereafter, the coated monolithic carrier was dried at 130° C. and then fired at 400° C. for 1 hour thereby to form a coated monolithic carrier (B10) provided with coat layers having a total weight of 310 g per 1 liter of the monolithic carrier.

Thereafter, the coated monolithic carrier (B10) was impregnated with an aqueous solution of barium (Ba) acetate and fired at 400° C. for 1 hour after drying at 130° C. so as to carry 30 g of Ba (in oxide state) per 1 liter of the monolithic carrier. As a result, an exhaust gas purifying catalyst (C10) of Example 10 was produced.

Example 11

Titanium oxide powder was impregnated with an aqueous solution of dinitrodiammine platinum (Pt). The impregnated titanium oxide powder was dried and then fired in air at 400° C. for 1 hour thereby to form the titanium oxide powder carrying Pt (Powder 18). This powder had a Pt concentration of 4% by weight.

Furthermore, activated alumina powder (γ-alumina) was impregnated with an aqueous solution of rhodium (Rh) nitrate. The impregnated activated alumina powder was dried and then fired in air at 400° C. for 1 hour thereby to form activated alumina powder carrying Rh (Powder 19). This powder had a Rh concentration of 4% by weight.

Subsequently, a porcelain ball mill was charged with 97.5 g of Powder 18, 102.5 g of titanium oxide and 200 g of water. The content of the ball mill was mixed and pulverized thereby to form a slurry in which fine powder (materials in powder state) was dispersed. The fine powder in the slurry had an average particle size of 3.2 μm. This slurry was coated on a cordierite ceramic honeycomb-type monolithic carrier having a volume of 1.3 liters and 400 cells per square inch. The cells were formed extending throughout the length of the monolithic carrier. Then, the coated monolithic carrier was blown with air to remove excessive slurry in the cells under the influence of air stream. Thereafter, the coated monolithic carrier was dried at 130° C. and then fired at 400° C. for 1 hour thereby to form a coated monolithic carrier (A11) provided with a coat layer having a weight of 200 g per 1 liter of the monolithic carrier.

A porcelain ball mill was charged with 97.5 g of Powder 18, 17.5 g of Powder 19 and 115 g of water. The content of the ball mill was mixed and pulverized thereby to form a slurry in which fine powder (materials in powder state) was dispersed. The fine powder in the slurry had an average particle size of 3.2 μm. This slurry was coated on the coated monolithic carrier (A11) with the coat layer. Then, the coated monolithic carrier (A11) was blown with air to remove excessive slurry in the cells under the influence of air stream. Thereafter, the coated monolithic carrier was dried at 130° C. and then fired at 400° C. for 1 hour thereby to form a coated monolithic carrier (B11) provided with coat layers having a total weight of 310 g per 1 liter of the monolithic carrier.

Thereafter, the coated monolithic carrier (B11) was impregnated with an aqueous solution of barium (Ba) acetate and fired at 400° C. for 1 hour after drying at 130° C. so as to carry 30 g of Ba (in oxide state) per 1 liter of the monolithic carrier. As a result, an exhaust gas purifying catalyst (C11) of Example 11 was produced.

Example 12

The coated monolithic carrier (B10) formed the same as that in Example 10 was impregnated with an aqueous solution of magnesium (Mg) acetate and fired at 400° C. for 1 hour after drying at 130° C. so as to carry 30 g of Mg (in oxide state). As a result, an exhaust gas purifying catalyst of Example 12 was produced.

Example 13

The coated monolithic carrier (B10) formed the same as that in Example 10 was impregnated with an aqueous solution of cesium (Cs) carbonate and fired at 400° C. for 1 hour after drying at 130° C. so as to carry 30 g of Cs (in oxide state). As a result, an exhaust gas purifying catalyst of Example 13 was produced.

Example 14

Activated alumina (γ-alumina) powder, cerium nitrate and zirconyl nitrate, lanthanum nitrate and water were mixed to form a mixture. The mixture was dried at 150° C. for 3 hours and then fired at 400° C. for 1 hour thereby forming an alumina powder carrying Ce, Zr and La, in which the weight % of Ce, Zr and La (in oxide state) were respectively 2, 7 and 7.

The Ce-Zr-La carrying activated alumina powder was impregnated with an aqueous solution of dinitrodiammine platinum (Pt). The impregnated activated alumina was dried and then fired in air at 400° C. for 1 hour thereby to form activated alumina powder carrying Pt (Powder 16). This powder had a Pt concentration of 2% by weight.

Furthermore, activated alumina powder (γ-alumina) was impregnated with an aqueous solution of rhodium (Rh) nitrate. The impregnated activated alumina powder was dried and then fired in air at 400° C. for 1 hour thereby to form activated alumina powder carrying Rh (Powder 17). This powder had a Rh concentration of 4% by weight.

Subsequently, a porcelain ball mill was charged with 97.5 g of Powder 16, 102.5 g of alumina and 200 g of water to form a slurry in which fine powder (materials in powder state) was dispersed. The fine powder in the slurry had an average particle size of 3.2 μm. This slurry was coated on a cordierite ceramic honeycomb-type monolithic carrier having a volume of 1.3 liters and 400 cells per square inch. The cells were formed extending throughout the length of the monolithic carrier. Then, the coated monolithic carrier was blown with air to remove excessive slurry in the cells under the influence of air stream. Thereafter, the coated monolithic carrier was dried at 130° C. and then fired at 400° C. for 1 hour thereby to form a coated monolithic carrier (A14) provided with a coat layer having a weight of 200 g per 1 liter of the monolithic carrier.

A porcelain ball mill was charged with 97.5 g of Powder 16, 17.5 g of Powder 17 and 115 g of water. The content of the ball mill was mixed and pulverized thereby to form a slurry in which fine powder (materials in powder state) was dispersed. The fine powder in the slurry had an average particle size of 3.2 μm. This slurry was coated on the coated monolithic carrier (A14) with the coat layer. Then, the coated monolithic carrier (A14) was blown with air to remove excessive slurry in the cells under the influence of air stream. Thereafter, the coated monolithic carrier was dried at 130° C. and then fired at 400° C. for 1 hour thereby to form a coated monolithic carrier (B14) provided with coat layers having a total weight of 310 g per 1 liter of the monolithic carrier.

Thereafter, the coated monolithic carrier (B14) was impregnated with an aqueous solution of dinitrodiammine platinum (Pt) and fired at 400° C. for 1 hour after drying at 130° C. so as to carry 3.9 g of Pt (in oxide state) per 1 liter of the monolithic carrier thus forming a coated monolithic carrier (D14). The coated monolithic carrier (D14) was impregnated with an aqueous solution of barium (Ba) acetate and fired at 400° C. for 1 hour after drying at 130° C. so as to carry 30 g of Ba (in oxide state) per 1 liter of the monolithic carrier. As a result, an exhaust gas purifying catalyst (E14) of Example 14 was produced.

COMPARATIVE EXAMPLE 1

A coated monolithic carrier (a1) was prepared in the same manner as that (A1) in Example 1 with the exception that 100g of Powder 1, 50 g of Powder 2, 100 g of alumina and 250 g of water were used. The coated monolithic carrier (a1) was provided with a coat layer having a weight of 125 g per 1 liter of the monolithic carrier.

Subsequently, a coated monolithic carrier (b1) was prepared in the same manner as that (B1) in Example 1 with the exception that 50 g of Powder 2, 50 g of Powder 3, 150 g of alumina and 250 g of water were used. The coated monolithic carrier (b1) was provided with coat layers having a total weight of 250 g per 1 liter of the monolithic carrier.

The coated monolithic carrier (b1) was subjected to the same procedure as that (B1) in Example 1. As a result, an exhaust gas purifying catalyst (c1) of Comparative Example 1 was produced.

COMPARATIVE EXAMPLE 2

A coated monolithic carrier (a2) was prepared in the same manner as that (A1) in Example 1 with the exception that 250 g of alumina and 250 g of water were used. The coated monolithic carrier (a2) was provided with a coat layer having a weight of 125 g per 1 liter of the monolithic carrier.

Subsequently, a coated monolithic carrier (b2) was prepared in the same manner as that (B1) in Example 1 with the exception that 100 g of Powder 1, 100 g of Powder 2, 50 g of Powder 3 and 250 g of water were used. The coated monolithic carrier (b2) was provided with coat layers having a total weight of 250 g per 1 liter of the monolithic carrier.

The coated monolithic carrier (b2) was subjected to the same procedure as that (B1) in Example 1. As a result, an exhaust gas purifying catalyst (c2) of Comparative Example 2 was produced.

COMPARATIVE EXAMPLE 3

A coated monolithic carrier (a3) was prepared in the same manner as that (A1) in Example 1 with the exception that 100 g of Powder 1, 100 g of Powder 2, 50 g of alumina and 250 g of water were used. The coated monolithic carrier (a3) was provided with a coat layer having a weight of 125 g per 1 liter of the monolithic carrier.

Subsequently, a coated monolithic carrier (b3) was prepared in the same manner as that (B1) in Example 1 with the exception that 50 g of Powder 3, 200 g of alumina, 250 g of water were used. The coated monolithic carrier (b3) was provided with coat layers having a total weight of 250 g per 1 liter of the monolithic carrier.

The coated monolithic carrier (b3) was subjected to the same procedure as that (B1) in Example 1. As a result, an exhaust gas purifying catalyst (c3) of Comparative Example 3 was produced.

COMPARATIVE EXAMPLE 4

A coated monolithic carrier (a4) was prepared in the same manner as that (A1) in Example 1 with the exception that 100 g of Powder 1, 50 g of alumina and 250 g of water were used. The coated monolithic carrier (a4) was provided with a coat layer having a weight of 125 g per 1 liter of the monolithic carrier.

Subsequently, a coated monolithic carrier (b4) was prepared in the same manner as that (B1) in Example 1 with the exception that 100 g of Powder 2, 50 g of Powder 3, 100 g of alumina and 250 g of water were used. The coated monolithic carrier (b4) was provided with coat layers having a total weight of 250 g per 1 liter of the monolithic carrier.

The coated monolithic carrier (b4) was subjected to the same procedure as that (B1) in Example 1. As a result, an exhaust gas purifying catalyst (c4) of Comparative Example 4 was produced.

COMPARATIVE EXAMPLE 5

A coated monolithic carrier (a5) was prepared in the same manner as that (A1) in Example 1 with the exception that 50 g of Powder 2, 200 g of alumina and 250 g of water were used. The coated monolithic carrier (a5) was provided with a coat layer having a weight of 125 g per 1 liter of the monolithic carrier.

Subsequently, a coated monolithic carrier (b5) was prepared in the same manner as that (B1) in Example 1 with the exception that 100 g of Powder 1, 50 g of Powder 2, 50 g of Powder 3, 50 g of alumina and 250 g of water were used. The coated monolithic carrier (b5) was provided with coat layers having a total weight of 250 g per 1 liter of the monolithic carrier.

The coated monolithic carrier (b5) was subjected to the same procedure as that (B1) in Example 1. As a result, an exhaust gas purifying catalyst (c5) of Comparative Example 5 was produced.

COMPARATIVE EXAMPLE 6

A coated monolithic carrier (a6) was prepared in the same manner as that (A1) in Example 1 with the exception that 50 g of Powder 2, 200 g of alumina and 250 g of water were used, employing a cordierite honeycomb type monolithic carrier having a volume of 0.65 liter and 400 cells per square inch. The coated monolithic carrier (a6) was provided with a coat layer having a weight of 125 g per 1 liter of the monolithic carrier.

The coated monolithic carrier (a6) was subjected to the same procedure as that (B1) in Example 1. As a result, an exhaust gas purifying catalyst (a'6) was produced to be located at a front side.

A coated monolithic carrier (b6) was prepared in the same manner as that (A1) in Example 1 with the exception that 100 g of Powder 1, 50 g of Powder 2, 50 g of Powder 3, 50 g of alumina and 250 g of water were used, employing a cordierite honeycomb type monolithic carrier having a volume of 0.65 liter and 400 cells per square inch. The coated monolithic carrier (b6) was provided with a coat layer having a weight of 125 g per 1 liter of the monolithic carrier.

The coated monolithic carrier (b6) was subjected to the same procedure as that (B1) in Example 1. As a result, an exhaust gas purifying catalyst (b'6) was produced to be located at a rear side (downstream side) relative to the front side catalyst (a'6).

The catalysts (a'6, b'6) were axially arranged to form an exhaust gas purifying catalyst of Comparative Example 6.

Table 1 shows the following data of the exhaust gas purifying catalysts of Examples 1 to 14 and Comparative Examples 1 to 6:

a) "Noble metal (g/l.) in upper layer part (Front side)" means the amount of the noble metal(s) contained in the upper layer part or the front side catalyst (in Comparative Example 6);

b) "Noble metal (g/l.) in lower layer part (Rear side)" means the amount of the noble metal(s) contained in the lower layer part or the rear side catalyst (in Comparative Example 6);

c) "Pt(%) in surface layer portion relative to total Pt" means the amount (%) of Pt contained in the surface layer portion lying between the surface of the catalytic layer and a depth of 0.1 mm from the surface of the catalytic layer, relative to the total amount of Pt contained in the catalytic layer;

d) "Noble metal (%) in upper layer part relative to total noble metal" means the amount of the noble metal(s) contained in the upper layer part relative to the total amount of the noble metal(s) contained in the catalytic layer;

e) "Particle size in slurry" means the average particle size of fine powder (materials) contained in the slurry. The average particle size was measured by a laser diffraction scattering method using a light source of semiconductor laser having a wavelength of 680 nm and an output power of 3 mW;

e) "Carrier powder for Pt" means the carrier powder on which Pt was carried; and f) "NOx trapping substance" means the kind of the NOx trapping substance used in the exhaust gas purifying catalyst.

EVALUATION OF PERFORMANCE OF EXHAUST GAS PURIFYING CATALYST

An internal combustion engine having a displacement of 2000 cc was provided with an exhaust system including an exhaust gas passageway. The exhaust gas purifying catalyst of Examples and Comparative Examples was disposed in the exhaust gas passageway as a catalytic converter, as shown in FIG. 3. An evaluation test of the exhaust gas purifying catalyst was conducted as follows:

This engine was operated repeating a changing operational cycle (evaluation mode) including a first engine operation of 60 seconds on air-fuel mixture having an air-fuel ratio (A/F) of 14.6, a second engine operation of 20 seconds on air-fuel mixture having an air-fuel ratio (A/F) of 22, and a third engine operation of 20 seconds on air-fuel mixture having an air-fuel ratio (A/F) of 50. The first, second and third engine operations were successively made in the order named. During engine operation, the temperature of exhaust gas immediately upstream of the catalyst was kept at 350° C. During one changing operational cycle, total amounts (ppm) of an exhaust gas component (HC, CO, NOx) was measured respectively at positions of the exhaust gas passageway upstream and downstream of the exhaust gas purifying catalyst. Such measurement was made on the exhaust gas purifying catalyst both in a state at the initial period of a durability test and in a state after the durability test, thereby calculating a conversion rate (%) shown in Table 2. The conversion rate (%) was calculated by [(1− the total amount of the gas component in the exhaust gas passageway downstream of the catalyst/the total amount of the gas component in the exhaust gas passageway upstream of the catalyst)×100].

The durability test was conducted as follows: The exhaust gas purifying catalyst of Examples and Comparative Examples was disposed in an exhaust gas passageway (forming part of an exhaust system) of an internal combustion engine having a displacement of 4400 cc. The engine was operated for 50 hours in which the temperature of exhaust gas immediately upstream of the catalyst was kept at 700° C.

Concerning Comparative Example 6, in the evaluation test and durability test, the front side exhaust gas purifying catalyst (a'6) was located upstream of the rear side exhaust gas purifying catalyst (b'6) with respect to the direction of flow of exhaust gas in the exhaust gas passageway.

The results of the evaluation test are shown in Table 2 and reveal that the conversion rates (%) of the exhaust gas purifying catalysts of Examples 1 to 14 after the durability test are lowered only about 10% relative to that at the initial time. In contrast, the conversion rate (%) of the exhaust gas purifying catalysts of Comparative Examples 1 to 6 are lowered about 20% or more relative to that at the initial time. Additionally, lowering in conversion rates of HC and CO of the catalysts of Examples after durability test is small as compared with that of Comparative Examples. These depict that the exhaust gas purifying catalysts of Examples are excellent in exhaust gas purification performance as compared with the exhaust gas purifying catalysts of Comparative Examples.

As appreciated from the above, according to the present invention, the catalytic layer formed on the refractory inorganic carrier contains the noble metals and the NOx trapping substance, in which the locational relationship between platinum and the NOx trapping substance is suitably controlled. As a result, the exhaust gas purifying catalyst becomes high in NOx trapping characteristics in the lean (oxygen-excess) exhaust gas atmosphere and effectively promoting reaction of released NOx and the reducing agents such as HC and CO. Thus, the exhaust gas purifying catalyst is excellent in NOx reduction performance and in durability.

The entire contents of Japanese Patent Application P11-196254 (filed Jul. 9, 1999) are incorporated herein by reference.

Although the invention has been described above by reference to certain examples of the invention, the invention is not limited to the examples described above. Modifications and variations of the examples described above will occur to those skilled in the art, in light of the above teachings. The scope of the invention is defined with reference to the following claims.

TABLE 1

|  | Noble metal (g/l.) in upper layer part (Front side) | | | Noble metal (g/l.) in lower layer part (Rear side) | | | Pt (%) in surface layer portion | Noble metal (%) in upper layer part relative to | Particle size |  | NOx trapping |
| --- | --- | --- | --- | --- | --- | --- | --- | --- | --- | --- | --- |
|  | Pt | Pd | Rh | Pt | Pd | Rh | relative to total Pt | total noble metal | in slurry | Carrier powder for Pt | substance |
| Example 1 | 4.0 | 2.0 | 0.5 | 0.0 | 2.0 | 0.0 | 100% | 76% | 3.2 μm | γ-alumina | Ba |
| Example 2 | 2.0 | 4.0 | 0.5 | 2.0 | 0.0 | 0.0 | 50% | 76% | 3.2 μm | γ-alumina | Ba |
| Example 3 | 2.0 | 2.0 | 0.5 | 2.0 | 2.0 | 0.0 | 50% | 53% | 3.2 μm | γ-alumina | Ba |
| Example 4 | 0.4 | 2.0 | 0.5 | 3.6 | 2.0 | 0.0 | 10% | 34% | 3.2 μm | γ-alumina | Ba |
| Example 5 | 1.1 | 1.0 | 0.5 | 3.0 | 2.0 | 0.0 | 27% | 34% | 3.2 μm | γ-alumina | Ba |
| Example 6 | 2.5 | 2.5 | 0.5 | 1.5 | 3.0 | 0.0 | 63% | 55% | 3.2 μm | γ-alumina | Ba |
| Example 7 | 4.0 | 2.0 | 0.5 | 0.0 | 2.0 | 0.0 | 100% | 76% | 3.2 μm | γ-alumina | Ba |
| Example 8 | 2.7 | 1.4 | 0.4 | 2.7 | 1.4 | 0.0 | 50% | 52% | 3.2 μm | Ce, Zr, La-carrying γ-alumina | Cs |
| Example 9 | 2.7 | 1.4 | 0.4 | 2.7 | 1.4 | 0.0 | 50% | 52% | 3.2 μm | γ-alumina | Cs |
| Example 10 | 3.9 | 0.0 | 0.7 | 3.9 | 0.0 | 0.0 | 50% | 54% | 3.2 μm | Ce, Zr, La-carrying γ-alumina | Ba |
| Example 11 | 3.9 | 0.0 | 0.7 | 3.9 | 0.0 | 0.0 | 50% | 54% | 3.2 μm | Titanium oxide | Ba |
| Example 12 | 3.9 | 0.0 | 0.7 | 3.9 | 0.0 | 0.0 | 50% | 54% | 3.2 μm | Ce, Zr, La-carrying γ-alumina | Mg |
| Example 13 | 3.9 | 0.0 | 0.7 | 3.9 | 0.0 | 0.0 | 50% | 54% | 3.2 μm | Ce, Zr, La-carrying γ-alumina | Cs |

TABLE 1-continued

| | Noble metal (g/l.) in upper layer part (Front side) | | | Noble metal (g/l.) in lower layer part (Rear side) | | | Pt (%) in surface layer portion relative to total Pt | Noble metal (%) in upper layer part relative to total noble metal | Particle size in slurry | Carrier powder for Pt | NOx trapping substance |
|---|---|---|---|---|---|---|---|---|---|---|---|
| | Pt | Pd | Rh | Pt | Pd | Rh | | | | | |
| Example 14 | 3.9 | 0.0 | 0.7 | 3.9 | 0.0 | 0.0 | 50% | 54% | 3.2 μm | Ce, Zr, La-carrying γ-alumina | Mg |
| Comparative example 1 | 0.0 | 2.0 | 0.5 | 4.0 | 2.0 | 0.0 | 0% | 29% | 3.2 μm | γ-alumina | Ba |
| Comparative example 2 | 4.0 | 4.0 | 0.5 | 0.0 | 0.0 | 0.0 | 100% | 100% | 3.2 μm | γ-alumina | Ba |
| Comparative example 3 | 0.0 | 0.0 | 0.5 | 4.0 | 4.0 | 0.0 | 0% | 6% | 3.2 μm | γ-alumina | Ba |
| Comparative example 4 | 0.0 | 4.0 | 0.5 | 0.0 | 4.0 | 0.0 | Nil(Pt) | 53% | 3.2 μm | γ-alumina | Ba |
| Comparative example 5 | 0.0 | 2.0 | 0.5 | 4.0 | 2.0 | 0.0 | 0% | 29% | 8.0 μm | γ-alumina | Ba |
| Comparative example 6 | 0.0 | 2.0 | 0.0 | 4.0 | 2.0 | 0.5 | 0% | 24% | 3.2 μm | γ-alumina | Ba |

TABLE 2

| | Conversion rate (%) | | | | | |
|---|---|---|---|---|---|---|
| | At initial period | | | After durability test | | |
| | HC | CO | NOx | HC | CO | NOx |
| Example 1 | 97 | 99 | 91 | 96 | 98 | 82 |
| Example 2 | 98 | 99 | 90 | 95 | 98 | 80 |
| Example 3 | 97 | 99 | 90 | 95 | 98 | 80 |
| Example 4 | 98 | 99 | 88 | 96 | 98 | 77 |
| Example 5 | 97 | 99 | 89 | 95 | 98 | 79 |
| Example 6 | 98 | 99 | 90 | 96 | 98 | 80 |
| Example 7 | 98 | 99 | 88 | 96 | 98 | 77 |
| Example 8 | 97 | 99 | 90 | 97 | 98 | 82 |
| Example 9 | 97 | 99 | 90 | 95 | 98 | 80 |
| Example 10 | 97 | 99 | 90 | 97 | 98 | 82 |
| Example 11 | 97 | 99 | 90 | 95 | 98 | 80 |
| Example 12 | 97 | 99 | 90 | 97 | 98 | 77 |
| Example 13 | 97 | 99 | 90 | 95 | 98 | 80 |
| Example 14 | 97 | 99 | 90 | 95 | 98 | 82 |
| Comparative example 1 | 98 | 99 | 89 | 96 | 98 | 70 |
| Comparative example 2 | 97 | 99 | 89 | 91 | 96 | 69 |
| Comparative example 3 | 97 | 99 | 89 | 92 | 96 | 60 |
| Comparative example 4 | 97 | 99 | 89 | 94 | 96 | 69 |
| Comparative example 5 | 97 | 99 | 88 | 95 | 97 | 70 |
| Comparative example 6 | 97 | 98 | 87 | 90 | 92 | 60 |

What is claimed is:

1. An exhaust gas purifying catalyst comprising:
a refractory inorganic carrier; and
a catalytic layer coated on said refractory inorganic carrier, said catalytic layer containing platinum and at least one noble metal selected from the group consisting of palladium and rhodium, and a NOx trapping substance;
where platinum exists close enough to said NOx trapping substance to accept $NO_2$ from said NOx trapping substance, which $NO_2$ is produced according to a reaction expressed by the following chemical equation:

$$M(NO_3)_2 \rightarrow 2NO_2 + 3/2O_2 + MO$$

where M is said NOx trapping substance;
wherein platinum in an amount ranging from 10 to 100% by weight of total amount of platinum in said catalytic layer is contained in a surface layer portion which lies between a surface of said catalytic layer and a depth of 0.1 mm from the surface of said catalytic layer.

2. An exhaust gas purifying catalyst as claimed in claim 1, wherein said platinum and said NOx trapping substance are located close to each other to promote the reaction expressed by the chemical equation.

3. An exhaust gas purifying catalyst as claimed in claim 1, wherein said catalytic layer includes an upper layer part and a lower layer part, concentration of platinum being higher in said upper layer part than in said lower layer part.

4. An exhaust gas purifying catalyst as claimed in claim 1, wherein said NOx trapping substance is at least one substance selected from the group consisting of alkaline metal and alkaline earth metal, at least a part of said NOx trapping substance being located exposed to the surface of said catalytic layer.

5. An exhaust gas purifying catalyst as claimed in claim 4, wherein said NOx trapping substance is at least one substance selected from the group consisting of magnesium, calcium, strontium, barium, sodium, potassium and cesium.

6. An exhaust gas purifying catalyst as claimed in claim 1, wherein said catalytic layer consists of an upper layer part, and a lower layer part, said upper layer containing platinum and rhodium, said lower layer part contains at least one of platinum and palladium.

7. An exhaust gas purifying catalyst as claimed in claim 6, wherein platinum in an amount ranging from 30 to 80% by weight of total amount of platinum in said catalytic layer is contained in said upper layer part of said catalytic layer.

8. An exhaust gas purifying catalyst as claimed in claim 1, wherein said catalytic layer includes alumina powder, and rhodium carried in an amount ranging from 0.1 to 2.0 g per liter of said refractory inorganic carrier, on said alumina powder.

9. An exhaust gas purifying catalyst as claimed in claim 1, wherein said catalytic layer includes particle materials which have an average particle size not larger than 4 μm.

10. An exhaust gas purifying catalyst as claimed in claim 1, wherein said exhaust gas purifying catalyst is used for purifying exhaust gas discharged from a lean-burn engine which is supplied with air-fuel mixture whose air-fuel ratio changes within a range of from 10 to 50.

11. An exhaust gas purifying catalyst as claimed in claim 10, wherein the air-fuel ratio of-the air-fuel mixture changes within a first range of from 10 to 14.8 and within a second range of from 15 to 50.

12. An exhaust gas purifying catalyst in combination with a lean-burn engine operated mainly on an air-fuel mixture whose air-fuel ratio is leaner than a stoichiometric level, said exhaust gas purifying catalyst including:
  a refractory inorganic carrier; and
  a catalytic layer coated on said refractory inorganic carrier, said catalytic layer containing platinum and at least one noble metal selected from the group consisting of palladium and rhodium, and a NOx trapping substance;
  wherein platinum exists close enough to said NOx trapping substance to accept $NO_2$ from said NOx trapping substance, which $NO_2$ is produced according to a reaction expressed by the following chemical equation:

$$M(NO_3)_2 \rightarrow 2NO_2 + 3/2O_2 + MO$$

where M is said NOx trapping substance;
  wherein platinum in an amount ranging from 10 to 100% by weight of total amount of platinum in said catalytic layer is contained in a surface layer portion which lies between a surface of said catalytic layer and a depth of 0.1 mm from the surface of said catalytic layer.

13. A method of producing an exhaust gas purifying catalyst, comprising:
  forming a first coat layer on a refractory inorganic carrier, said first coat layer containing at least one of platinum and palladium;
  forming a second coat layer on said first coat layer, said second coat layer containing platinum and rhodium and being higher in concentration of platinum than said first coat layer; and
  impregnating at least one of said first and second coat layers with a NOx trapping substance;
  wherein platinum in an amount ranging from 10 to 100% by weight of total amount of platinum in said second coat layer is contained in a surface layer portion which lies between a surface of said second coat layer and a depth of 0.1 mm from the surface of said second coat layer.

14. A method as claimed in claim 13, wherein forming said first coat layer includes impregnating carrier powder with said at least one of platinum and palladium, and forming said second coat layer includes impregnating carrier powder with said platinum and rhodium.

15. A method as claimed in claim 13, wherein said NOx trapping substance is at least one substance selected from the group consisting of magnesium, calcium, strontium, barium, sodium, potassium and cesium.

* * * * *